US010050726B2

(12) United States Patent
Welle et al.

(10) Patent No.: US 10,050,726 B2
(45) Date of Patent: Aug. 14, 2018

(54) FILL LEVEL AND TOPOLOGY DETERMINATION

(71) Applicant: VEGA GRIESHABER KG, Wolfach (DE)

(72) Inventors: Roland Welle, Hausach (DE); Levin Dieterle, Wolfach (DE)

(73) Assignee: VEGA GRIESHABER KG, Wolfach (DE)

(*) Notice: Subject to any disclaimer, the term of this patent is extended or adjusted under 35 U.S.C. 154(b) by 122 days.

(21) Appl. No.: 15/117,654

(22) PCT Filed: Feb. 11, 2014

(86) PCT No.: PCT/EP2014/052628
§ 371 (c)(1),
(2) Date: Aug. 9, 2016

(87) PCT Pub. No.: WO2015/120880
PCT Pub. Date: Aug. 20, 2015

(65) Prior Publication Data
US 2016/0352437 A1     Dec. 1, 2016

(51) Int. Cl.
*H04B 17/10*   (2015.01)
*G01F 23/284*  (2006.01)
(Continued)

(52) U.S. Cl.
CPC ......... *H04B 17/103* (2015.01); *G01F 23/284* (2013.01); *H01Q 1/225* (2013.01);
(Continued)

(58) Field of Classification Search
CPC ...... H01Q 1/225; H01Q 15/08; H01Q 19/062; H01Q 21/065
See application file for complete search history.

(56) References Cited

U.S. PATENT DOCUMENTS

| 6,288,672 B1 | 9/2001 | Asano et al. |
| 2008/0100501 A1 | 5/2008 | Edvardsson |

(Continued)

FOREIGN PATENT DOCUMENTS

| DE | 101 49 851 A1 | 4/2003 |
| EP | 0 534 862 A1 | 3/1993 |

(Continued)

OTHER PUBLICATIONS

International Search Report dated Oct. 17, 2014 in PCT/EP14/052628 Filed Feb. 11, 2014.
(Continued)

*Primary Examiner* — Graham Smith
(74) *Attorney, Agent, or Firm* — Oblon, McClelland, Maier & Neustadt, L.L.P.

(57) ABSTRACT

An antenna apparatus for a fill level measurement device is provided, including an antenna configured to emit a measurement signal towards a filling material surface and to receive a reflected measurement signal reflected by the filling material surface; a motor configured to rotate the antenna about an axis of rotation; and an elongate focussing arrangement configured to focus the emitted measurement signal and/or the reflected measurement signal, wherein the antenna includes an array of a plurality of radiator elements configured to emit the measurement signal and/or to receive the reflected measurement signal.

16 Claims, 5 Drawing Sheets

(51) Int. Cl.
*H01Q 1/22* (2006.01)
*H01Q 3/04* (2006.01)
*H01Q 15/08* (2006.01)
*H01Q 19/06* (2006.01)
*H01Q 19/19* (2006.01)
*H01Q 21/06* (2006.01)
*H01Q 15/16* (2006.01)

(52) U.S. Cl.
CPC ............... *H01Q 3/04* (2013.01); *H01Q 15/08* (2013.01); *H01Q 15/16* (2013.01); *H01Q 19/062* (2013.01); *H01Q 19/19* (2013.01); *H01Q 21/065* (2013.01)

(56) References Cited

U.S. PATENT DOCUMENTS

2009/0256737 A1 10/2009 Ohlsson
2010/0031753 A1 2/2010 Mayer et al.
2013/0269414 A1 10/2013 Ferraro et al.

FOREIGN PATENT DOCUMENTS

| EP | 0 918 367 A2 | 5/1999 |
| EP | 2 637 253 A1 | 9/2013 |
| FR | 2 767 226 A1 | 2/1999 |
| JP | 6-11328 A | 1/1994 |
| WO | WO 2009/025456 A1 | 2/2009 |

OTHER PUBLICATIONS

International Preliminary Report on Patentability and Written Opinion of the International Searching Authority dated Aug. 25, 2016 in PCT/EP2014/052628 filed Feb. 11, 2014 (submitting English translation).

European Office Action dated Jun. 8, 2018 in corresponding European Application No. 14 703 605.7, citing documents AO-AR therein (7 pages).

FILL LEVEL AND TOPOLOGY DETERMINATION

FIELD OF THE INVENTION

The invention relates to the determination of the fill level and topology of a filling material surface. The invention relates in particular to an antenna apparatus for a fill level measurement device, to a fill level measurement device comprising an antenna apparatus of this type, to the use of an antenna apparatus of this type for determining the viscosity of a moving liquid, to the use of an antenna apparatus of this type for determining a mass flow rate of a bulk material on a conveyor belt, and to a method for determining the topology of a filling material surface.

BACKGROUND

Fill level measurement devices or other measurement devices used in the field of object monitoring emit electromagnetic waves or ultrasonic waves that are reflected, at least in part, by the filling material surface or the corresponding object. The at least partially reflected transmission signal can then be picked up by the antenna unit of the measurement device and evaluated by the electronic system connected to said antenna unit.

By scanning the surface, it is possible to determine the topology of the filling material surface or of the object(s). In the field of fill level measurement, "topology" should be understood to mean the shape of the surface of the filling material. The term "topography" can also be used in this context.

Such measurement devices for topology determination are often complex to produce and also operate.

SUMMARY OF THE INVENTION

An object of the invention is to provide a device and a method for determining the topology of a filling material surface that can reduce technical effort.

This object is achieved by the features of the independent claims. Developments of the invention can be found in the dependent claims and the following description.

A first aspect of the invention relates to an antenna apparatus for a fill level measurement device. The antenna apparatus comprises an antenna unit and a drive unit. The antenna unit is designed to emit a measurement signal towards a filling material surface and to receive the measurement signal reflected by the filling material surface. The filling material may be a moving liquid, but also may be a bulk material arranged either in a closed container or in the open air.

The drive unit is designed to rotate the antenna unit about an axis of rotation. Said axis of rotation can be a vertical axis of rotation, for example, if the antenna apparatus is installed in or on a container.

The antenna unit comprises an array, i.e. an arrangement, made up of a plurality of radiator elements. The array is designed to emit and receive the measurement signal.

The radiator elements are, for example, substantially two-dimensional, planar patches. They may also be the open ends of high frequency-optimised waveguides, for example.

Furthermore, an elongate focussing arrangement is provided, which is designed to focus the measurement signal emitted by the antenna unit. The elongate focussing arrangement has a longitudinal direction that extends in the longitudinal direction (referred to as the $Y_A$ direction in the following) of the array. Said focussing arrangement also has a transverse direction that extends in the transverse direction (also referred to as the $X_A$ direction in the following) of the array. The longitudinal extension of the elongate focussing arrangement can be greater than the transverse extension.

According to an embodiment of the invention, the focussing arrangement comprises a dielectric cylindrical lens, the longitudinal axis of which is parallel to the longitudinal direction of the antenna unit. According to another embodiment of the invention, the focussing arrangement comprises a parabolic trough as a main reflector and a counter reflector arranged at a spacing from the parabolic trough, the array for emitting the measurement signal towards the counter reflector being arranged either on or near to the surface of the parabolic trough.

Using the elongate focussing arrangement, it is possible to focus the measurement signal emitted by the array in one dimension (specifically in the transverse direction of the antenna arrangement). Therefore, the focussing arrangement assists with focussing the measurement signal in the transverse direction. It may be provided that the focussing arrangement does not assist with focussing the measurement signal in the longitudinal direction of the array. Electronic beam steering is provided for this purpose.

According to another embodiment of the invention, the array is a unidimensional array, the one column of which extends in the longitudinal direction of the antenna unit and therefore in the longitudinal direction of the focussing arrangement.

In this case in particular, the focussing property of the focussing arrangement is very advantageous for improving focussing of the measurement signal in the transverse direction.

According to another embodiment of the invention, the antenna apparatus comprises a high-frequency unit for generating the measurement signal, the high-frequency unit being integrated in the antenna unit.

The high-frequency unit can be designed to generate and process high-frequency signals, for example in a frequency range of from approximately 75 to 85 GHz.

The high-frequency unit can also be integrated in the drive unit.

According to another embodiment of the invention, the array is a two-dimensional array, the plurality of columns of which extend in the longitudinal direction of the antenna unit and the plurality of rows of which extend in the transverse direction of the antenna unit, the radiator elements of each column of the array being conductively interconnected.

As a result, the measurement signals can be partially focussed in one dimension in a similar manner to when a dielectric lens or a parabolic trough is used. The two-dimensional array consequently represents another embodiment of a focussing arrangement according to the invention, for focussing the measurement signal is focussed in the transverse direction.

Other devices for partially focussing the measurement signals that are known to a person skilled in the art can of course be used. In addition, it may be possible to combine several arrangements of this type for partial focussing in the transverse direction.

According to another embodiment of the invention, the antenna apparatus comprises an electronic evaluation system, which rotates together with the antenna unit when the antenna unit is rotated by the drive unit. The evaluation system may be suitable for determining and designed to determine the topology of a medium.

For example, the electronic evaluation system is located on the back of the antenna unit, i.e. on the side facing away from the filling material.

According to another embodiment of the invention, the electronic evaluation system is integrated in either the antenna unit or in the drive unit.

According to another embodiment of the invention, the radiator elements are arranged in one plane which, together with the axis of rotation of the antenna apparatus, forms an angle $\alpha$ that does not equal 90°. The angle $\alpha$ is, for example, 45°. This can increase the measuring range of the antenna.

Another aspect of the invention provides a fill level measurement device comprising an antenna apparatus as described above and in the following. This is for example a fill level radar. The fill level measurement device may comprise an evaluation unit for determining the topology and/or a value of a medium derived therefrom.

Another aspect of the invention provides the use of an antenna apparatus as described above and in the following, for determining the viscosity of a moving liquid.

Another aspect of the invention provides the use of an antenna apparatus as described above and in the following, for determining a mass flow rate of a bulk material on a conveyor belt.

Another aspect of the invention provides a method for determining the topology of a surface of a filling material or bulk material, in which an antenna unit is rotated about an axis of rotation. A measurement signal is simultaneously emitted towards a filling material surface by means of the antenna unit. The emitted measurement signal is focussed by means of an elongate focussing arrangement and the measurement signal reflected by the surface of the filling material or bulk material is received by the antenna unit. The topology of the surface of the filling material or bulk material is then calculated from the received measurement signal. The antenna unit comprises an array made up of a plurality of radiator elements, which is designed to emit and/or receive the measurement signal.

The array is, for example, a unidimensional array, i.e. a linear, serial arrangement of a plurality of radiator elements. A two-dimensional array can also be provided, in which the radiator elements in each row for example are conductively interconnected.

In the following, embodiments of the invention will be described with reference to the figures.

DETAILED DESCRIPTION OF EMBODIMENTS

Figure 1:
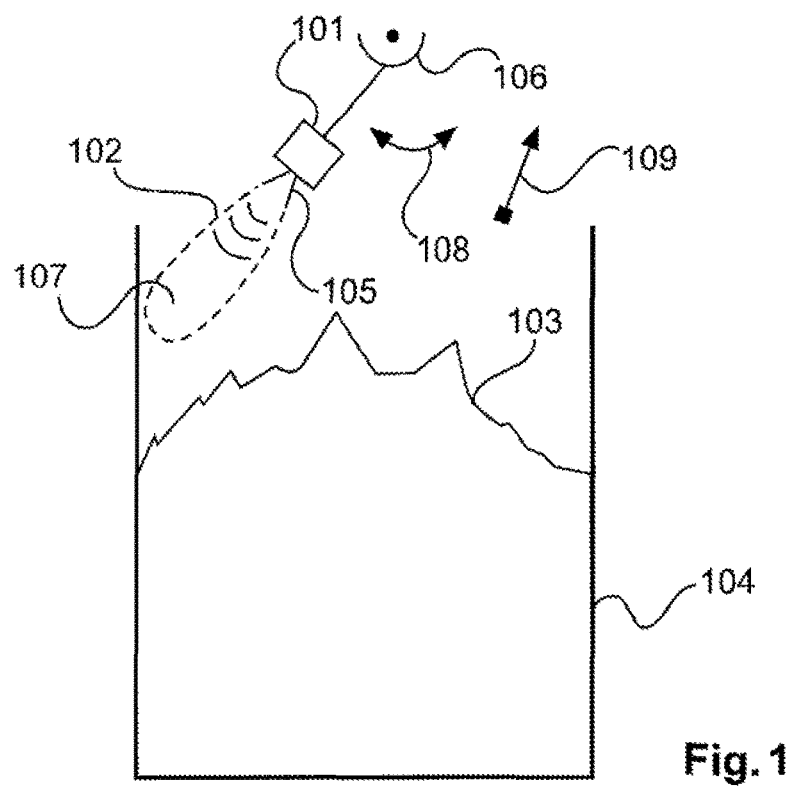
FIG. 1 shows a measurement device for recording the topology of a filling material surface.

The illustrations in the figures are schematic and not to scale.

Where the same reference numerals are used in different figures in the following description of the figures, they denote the same or similar elements. However, the same or similar elements may also be denoted by different reference numerals.

The present invention is applied to the field of fill level measurement devices, but application in the field of object monitoring or mass flow rate recording is also possible and intended. Recording the topology of a filling material surface can advantageously be applicable in particular to measuring bulk materials and the resultant angles of repose and/or removal hoppers either inside or outside closed containers. However, it may also be possible to record the topology of moving liquids. This arises in a non-trivial manner, for example when using stirrers and the flow patterns on the liquid surface (tornados) generated thereby, and can allow conclusions to be drawn about additional interesting variables, for example the viscosity or mixing of the filling material (taking into account the speed of the agitator if necessary).

FIG. 1 shows a fill level measurement device 101 which records an image of the reflection properties in the container 104 by emitting a signal 102 towards a filling material surface 103. The fill level measurement device or at least the transmission and/or receiving unit 105 of the device is able to change the main radiation direction 107 of the transmission and/or receiving unit 105 by means of a mechanical adjustment means 106 having a corresponding design, such that the entire surface 103 of the medium in the container can be measured as part of a measuring cycle. For this purpose, for example, the device can be pivoted in the X direction 108 and in the Y direction 109.

The fill level measurement device determines the topology from the plurality of echo curves recorded in the X direction and Y direction, i.e. the height profile of the filling material surface 103 as a function of the particular location, which, for example, can be clearly defined by the Cartesian coordinates X and Y.

Figure 2:
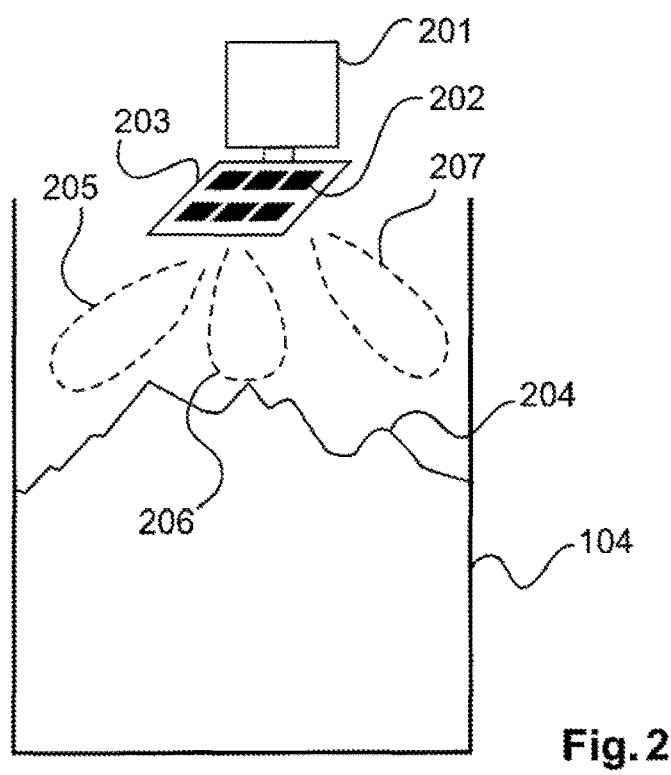
FIG. 2 shows a further measurement device for recording the topology of a filling material surface.

Another possibility for changing the main radiation direction of the measurement device is shown in FIG. 2. In contrast to the arrangement in FIG. 1, the measurement device 201 comprises a plurality of transmission and/or receiving elements 202, which can be implemented inside a single antenna 203 or can be distributed on a plurality of separate antennae. An antenna apparatus of this type can be referred to as an antenna array and can be used for digital beam shaping.

The fill level measurement device 201 changes the main radiation direction 205, 206, 207 in order to determine the topology of the filling material surface 204, either by changing the actuation signals of the individual elements 202 in a targeted manner, and/or by digitally calculating the echo curves recorded by the individual elements.

In purely mechanical solutions according to FIG. 1, a very complex mechanical construction 106 is required to carry out the mechanical deflection in the X and Y direction. Systems of this kind record many measurement points (for example 90×360 measurements each having 1 ms measurement time, i.e. more than 30 seconds per measurement cycle), in order to achieve high lateral resolutions in the X and Y direction.

Furthermore, systems of this kind have high mechanical wear on account of the high rotational speeds required for achieving low measurement cycle times.

In purely electronic solutions for changing the main radiation direction according to FIG. 2, n times m individual transmission and/or receiving channels need to be implemented separately. The indices n and m refer to the number of individual emitting elements 202 in the particular dimension. The resultant complexity of electronic components can lead to high production costs of such devices, making the use thereof in several applications appear to be economically unviable.

Furthermore, when changing the main radiation direction electronically and in the case of very large deflection angles (for example larger than 45° relative to the vertical), there is the problem that the width of the resultant antenna lobe increases significantly. Deflection of the main radiation direction 205, 206, 207 in the range of up to 90° relative to the vertical cannot be achieved in principle using systems of this kind.

Figure 3:
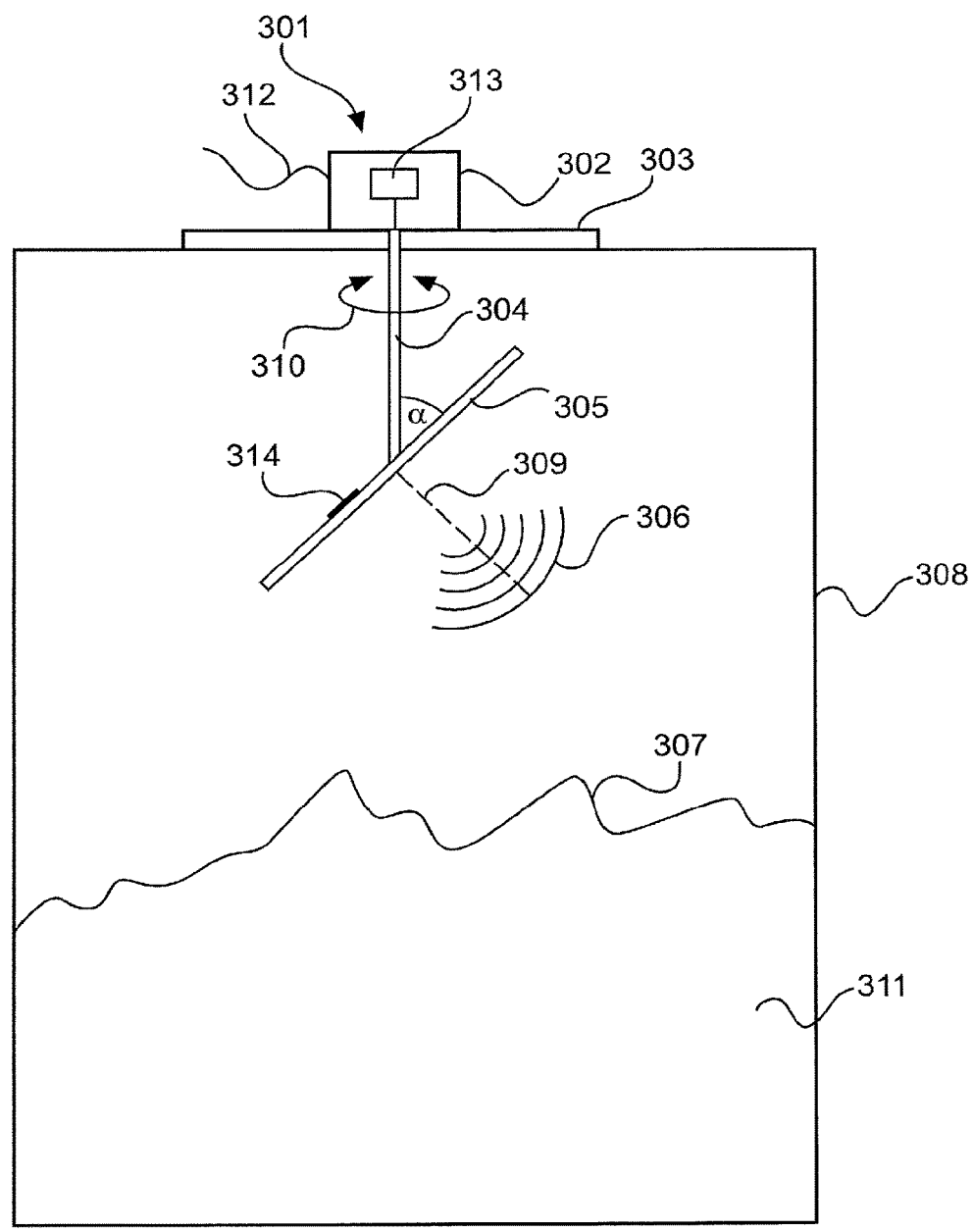
FIG. 3 shows a measurement device comprising an antenna device according to an embodiment of the invention.

A basic concept of the invention involves combining specific advantageous components of the above-described methods and devices. FIG. 3 shows a first embodiment of the invention. The measurement device 301 comprises a drive unit 302, a process coupling 303, a drive shaft 304 and at least one antenna unit 305.

In the embodiment in FIG. 3, the entire upper region of the fill level measurement device is denoted as the drive unit 302. The electronic evaluation system 313 is integrated in the drive unit and is connected to the antenna array such that the measurement signals received by the antenna array can be transmitted to the electronic evaluation system 313. Reference numeral 312 denotes a connection cable that can be used to supply energy and exchange data.

In addition to the electronic evaluation system, the other electronic system of the fill level measurement device can also be integrated in the drive unit 302.

Alternatively, the drive unit 302, the drive shaft 304 and the antenna unit 305 can form a modular unit that is connected to the actual main body of the fill level measurement device.

The antenna unit 305 emits the signals 306 generated by a high-frequency unit 314 towards the filling material surface 307 to be measured. In this case, the high-frequency unit 314 can be integrated inside the antenna unit 305. Alternatively, the high-frequency unit can also be provided in the region of the drive unit 302. In the embodiment in FIG. 3, the high-frequency unit is arranged on the back of the antenna unit 305.

The antenna unit 305 is rotatably mounted by means of the drive shaft 304, and forms an angle α that does not equal 90° relative thereto. An angle of 45°, which allows signals from large portion of the container 308 to be recorded, has proven to be particularly advantageous.

If an angular range of ±45° is recorded by means of digital beam shaping, it is therefore possible, in combination with the rotation of the antenna, to measure the complete half-space containing the bulk material. However, angles <45° are also possible in order to avoid ambiguities, for example, in digital beam shaping or to improve the resolution.

A plurality of transmission and/or receiving elements are provided along the extension of the antenna 305 ($Y_A$ direction). Each of these elements is able to process signals from a wide angular range (for example in the range of ±45° around the main direction of the antenna) along the extension $Y_A$, while the individual elements along the extension $X_A$ can also have clear transmission/receiving characteristics. The signals received individually by the elements can be used, together with known algorithms for digital beam shaping, to change the main radiation/receiving direction 309 of the antenna unit 305 in a predetermined angular range. If an angular range of ±45° relative to the vertical main radiation direction 309 is selected in this case, when taking into account the rotation 310 that also takes place, each point of the surface 307 of the filling medium 311 in the container 308 can be recorded by means of measurements.

The arrangement advantageously combines the advantages of mechanically changing the main radiation direction (in this case: rotation) with those of electronic scanning. Very fast measurement rates (for example less than 10 seconds) can be achieved in this way, together with a mechanically simpler construction (low rotational speed, typically approximately 60 min$^{-1}$) and greatly simplified electronic system complexity (for example on account of the unidimensional structure of the antenna array). A number of m<=20 elements is typically sufficient for implementing the unidimensional array row.

FIG. 4-7 show possible embodiments of the antenna unit.

Figure 4:
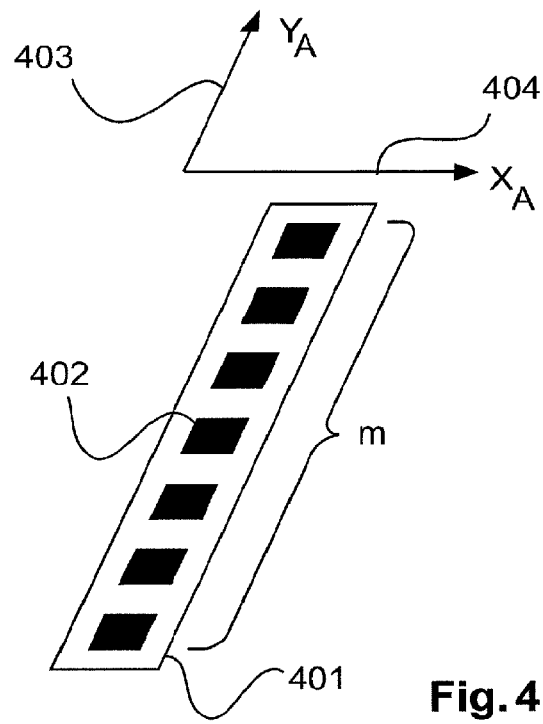
FIG. 4 shows an antenna unit according to an embodiment of the invention.

FIG. 4 shows a detail of a possible embodiment of the antenna unit 305. The antenna can consist for example of a unidimensional antenna array 401 having m individual elements. The individual elements can be implemented by printed circuit board patches having a corresponding design or by suitable waveguide ends or any other known emitting means.

In a first embodiment, the central individual element 402 can be used to uniformly emit high-frequency energy towards the filling material surface 307 in an angular range that is as large as possible. The signals reflected by the filling material surface are received by each of the elements of the antenna array 401, and are separately fed to a digital evaluation unit that is housed in the drive unit, for example. Using digital beam shaping algorithms, the evaluation unit is able to change the main radiation direction of the antenna by combining these signals, in particular in an angle of ±45° relative to the vertical 309 of the antenna unit.

At the same time, it will become clear at this point that the effort required for implementing separate transmission and/or receiving channels can be significantly reduced by reducing the conventionally two-dimensional array arrangement 203 to a single dimension 401.

The conventional array arrangement 203 comprises a typically complex electronic evaluation system circuit for each individual array element. The implementation effort is therefore reduced from n times m parallel circuits of this type to just m individual circuits corresponding to the m receiving elements.

The unidimensional array antenna 402 can achieve very effective focussing of the resulting antenna characteristics in the direction of the $Y_A$ extension 403 by using the subsequent signal processing steps for digital beam shaping. Focussing in the direction of the $X_A$ extension 404 (in this case this is the direction perpendicular to the main axis/longitudinal axis of the antenna array, in the plane of the antenna array), which, in combination with the rotation 310, acts precisely in the radial direction, may be insufficient for certain uses.

Several approaches are advantageous for further improving this behaviour. On the one hand, it is possible to retain an embodiment using the antenna according to FIG. 4. If, during the subsequent signal processing, the Doppler shift resulting from the rotation of the antenna is evaluated in the measurement signals recorded by the particular array elements, the resultant focussing in the transverse direction (radial direction ($X_A$ extension)) can be considerably improved. The algorithms used in this case can use the principles of SAR (synthetic aperture radar) and ROSAR (rotor synthetic aperture radar, based on rotating antennae).

Figure 5:
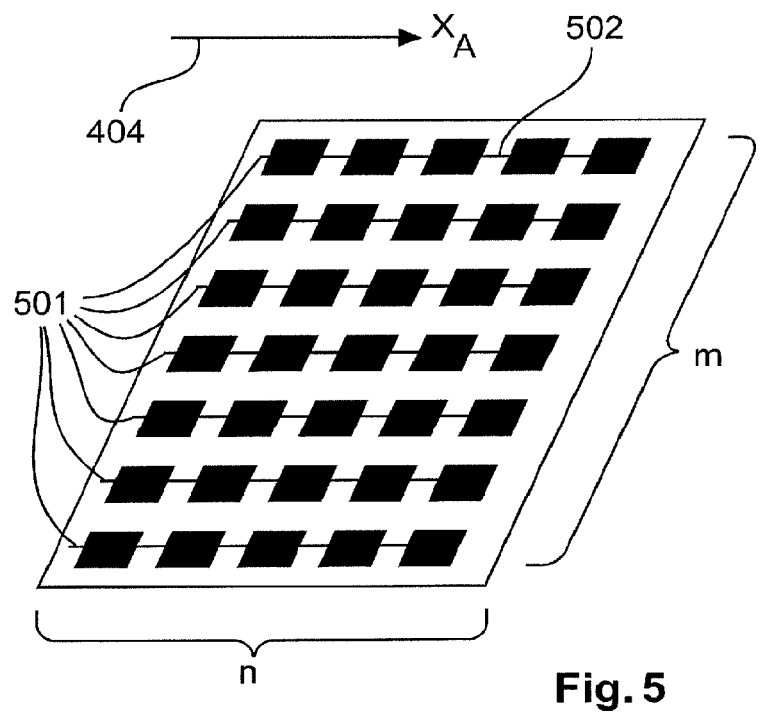
FIG. 5 shows an antenna unit according to another embodiment of the invention.

Another possibility involves the use of patch antennae in an enlargement of the mechanical extension of the antenna structure in the direction of the $X_A$ axis. FIG. 5 shows a corresponding example. The originally unidimensional antenna array 401 is widened in the direction of the $X_A$ axis 404 by means of additional patches 501. In order to keep the complexity of the associated electronic actuation system constant, the additional patches are mounted at a defined spacing from the patches 402 used up to now and are rigidly connected thereto by means of metal connecting strips 502.

In contrast to other two-dimensional antenna arrays 203, the extension of the originally unidimensional array is widened by the rigid metal connecting strips 502, without requiring additional components for additional high-frequency evaluation circuits.

Figure 6:
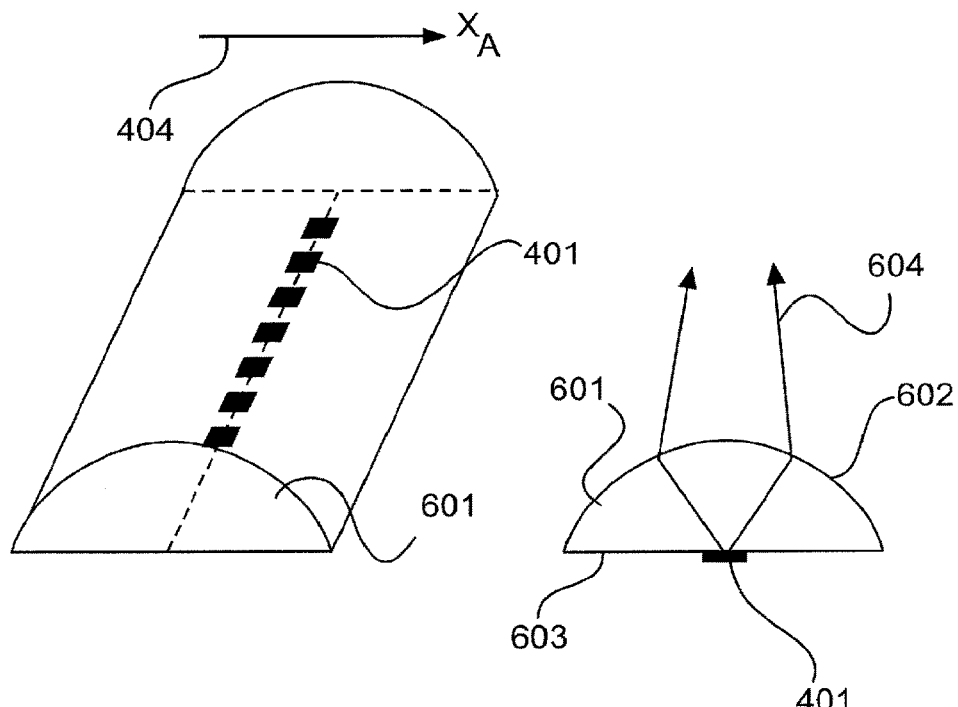
FIG. 6 shows an antenna unit according to another embodiment of the invention.

Furthermore, it is possible to focus along the $X_A$ direction using a dielectric cylindrical lens. FIG. 6 shows the unidimensional antenna array 401 described thus far, which comprises a cylindrical lens 601 mounted thereabove.

The cylindrical lens shown in FIG. 6 comprises a base 603, to which the radiator elements 401 are attached. The curved surface 602 of the cylindrical shell spans thereabove. For example, the unidimensional array 401 is arranged in the focal point of the cylindrical lens.

Figure 7:
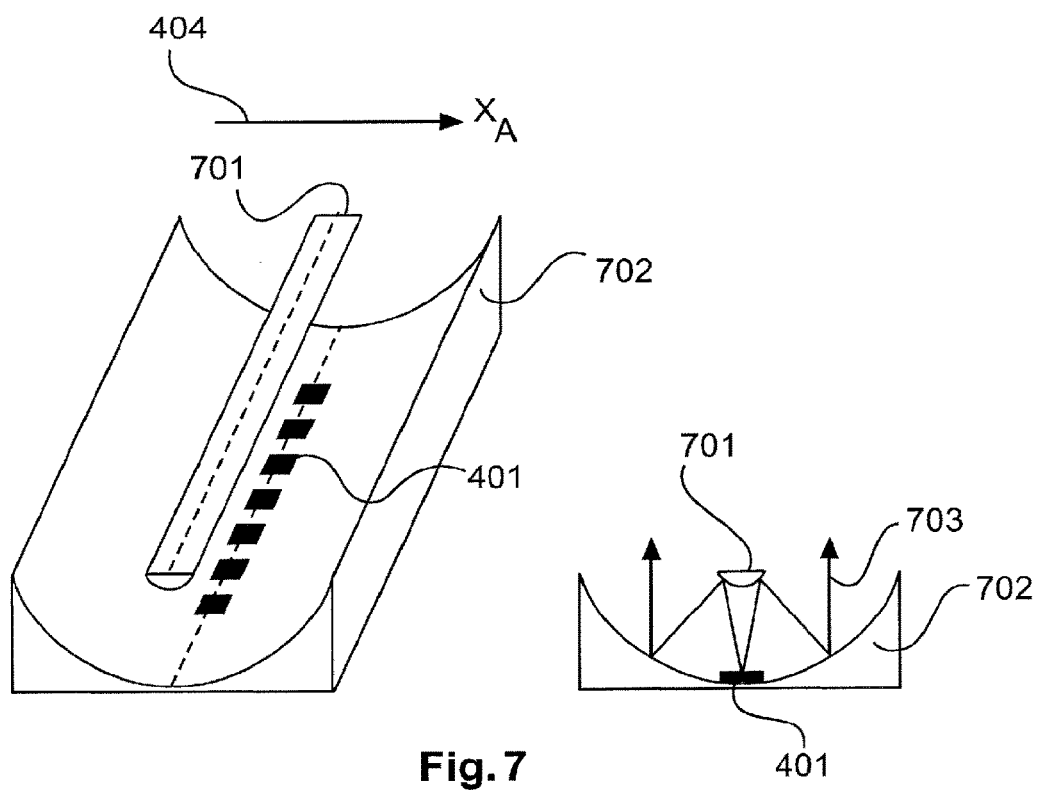
FIG. 7 shows an antenna unit according to another embodiment of the invention.

Another embodiment, which is particularly advantageous, provides the use of a parabolic trough as the main reflector in conjunction with a unidimensional Cassegrain antenna arrangement. FIG. 7 shows a corresponding example. In conjunction with a counter reflector 701 (for example a hyperbolic trough) having a corresponding design and the parabolic trough 702, the unidimensional antenna array 401 is highly focussed in the direction of the $X_A$ axis 404, rendering the use of the arrangement shown in conjunction with the measurement device 301 according to the invention particularly advantageous.

In the embodiment in FIG. 7, the unidimensional antenna array 401 is located on the curved, reflective surface of the parabolic trough 702 and radiates towards the counter reflector 701. The measurement signals 703 emitted are first reflected by the counter reflector towards the curved surface of the parabolic trough 702, and are then focussed from the curved surface of the parabolic trough 702 towards the filling material surface.

Furthermore, it is however also possible to use focussing devices that are not explained in this case for focussing in the $X_A$ direction and to combine these with a mechanical rotation.

Figure 8:
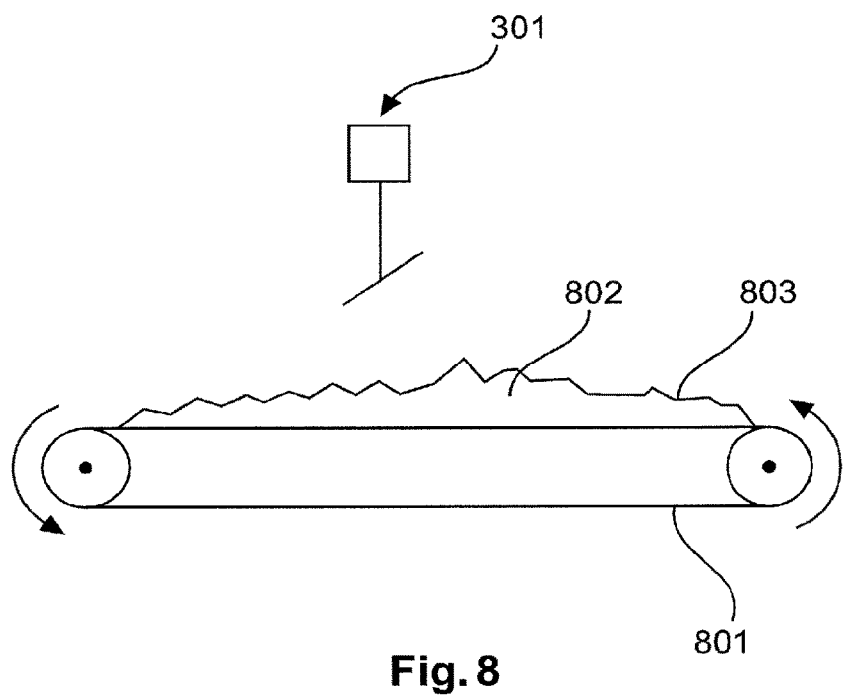
FIG. 8 shows a measurement device according to an embodiment of the invention for use to determine a mass flow rate of a bulk material on a conveyor belt.

FIG. 8 shows a conveyor belt 801, on which a bulk material 802 is transported. The bulk material forms an uneven surface 803, which can be measured by the measurement device 301. The measurement device 301 can be, for example, a fill level measurement device, for example a fill level radar device, which, in addition to the topography of the bulk material surface, can also calculate and output the fill level of the filling material.

Figure 9:
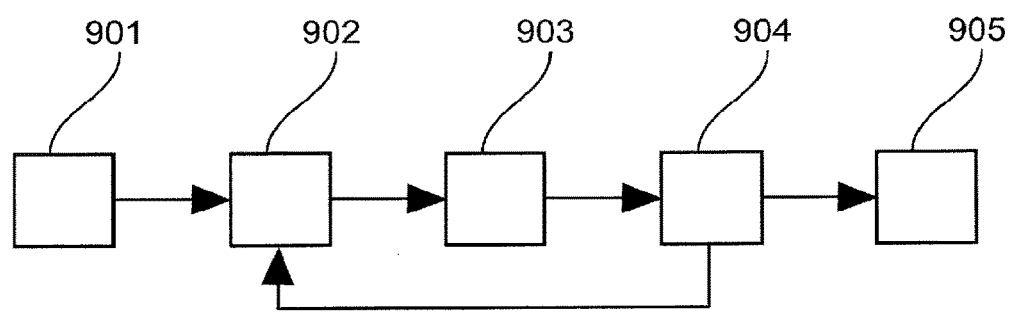
FIG. 9 shows a flow diagram of a method according to an embodiment of the invention.

FIG. 9 shows a flow chart of a method according to an embodiment of the invention. In step 901, an antenna unit is rotated about an axis of rotation, for example a vertical axis of rotation, either continuously or in stages. In step 902, the antenna unit emits a measurement signal, which is wide in the $Y_A$ direction, towards a filling material surface. In step 903, the measurement signal reflected by the filling material surface is received by the individual elements of the antenna unit. In step 904, echo curves are calculated from various main receiving directions of the antenna unit in the angular range to be measured by means of digital beam shaping.

The method then returns to step 902, followed by step 903, followed by a repeated digital scan across the angular range to be measured in the $Y_A$ direction by means of electronic beam steering (step 904). Steps 902-904 can now be carried out as often as necessary until a complete data set (several measurement points during one rotation) is recorded.

Lastly, in step 905 the topology of the filling material surface and/or the fill level is calculated from the measurement signals obtained by the antenna unit by means of digital beam shaping in the angular range scanned in step 901.

The invention therefore provides a device and a method for focussing a radar signal along a line which is guided over the surface of a filling medium by means of rotation. The topology of the medium in the container can be ascertained from the echo curves recorded from said focussing process. In particular, it may be provided that a substantially unidimensionally emitting antenna array, which allows for echo curves to be recorded along a first axis by means of digital beam shaping, is combined with a mechanical rotation about a second axis, so that it is possible to record echo curves from a two-dimensional field. These two axes are typically perpendicular to one another.

The invention therefore reduces the mechanical effort and the mechanical strain on a rotary antenna arrangement by combining said arrangement with a unidimensional antenna array, and this can optimise the length of time for recording echo curves in addition to the cost-effectiveness of the solution.

It should also be noted that "comprising" and "having" do not exclude the possibility of other elements or steps, and "one", "a" or "an" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. An antenna apparatus for a fill level measurement device, comprising:
    an antenna configured to emit a measurement signal towards a filling material surface and to receive a reflected measurement signal reflected by the filling material surface;
    a motor configured to rotate the antenna about an axis of rotation; and
    an elongate focussing arrangement configured to focus the emitted measurement signal and/or the reflected measurement signal,
    wherein the antenna comprises an array of a plurality of radiator elements configured to emit the measurement signal and/or to receive the reflected measurement signal.

2. The antenna apparatus according to claim 1, wherein the elongate focussing arrangement comprises a dielectric cylindrical lens having a longitudinal axis that is parallel to a longitudinal direction of the antenna.

3. The antenna apparatus according to claim 1,
wherein the elongate focussing arrangement comprises a parabolic trough as a main reflector, and a counter reflector arranged at a spacing from the parabolic trough, and
wherein the array is further configured to emit the measurement signal towards the counter reflector and is arranged either on or near to a surface of the parabolic trough.

4. The antenna apparatus according to claim 1,
wherein the array is a unidimensional array, having one column extending in a longitudinal direction of the antenna.

5. The antenna apparatus according to claim 1,
wherein the array is a two-dimensional array, having a plurality of columns extending in a longitudinal direction of the antenna, and a plurality of rows extending in a transverse direction of the antenna, and
wherein radiator elements of the plurality of radiator elements in each column of the plurality of columns are conductively interconnected.

6. The antenna apparatus according to claim 1, further comprising:
a high-frequency signal generator configured to generate the measurement signal, the high-frequency signal generator being integrated in the antenna.

7. The antenna apparatus according to claim 1, further comprising:
an electronic evaluation system configured to rotate together with the antenna when the antenna is rotated by the motor.

8. The antenna apparatus according to claim 7,
wherein the electronic evaluation system is integrated in either the antenna or in the motor.

9. The antenna apparatus according to claim 1,
wherein the plurality of radiator elements are disposed in one plane that forms an angle α with an axis of rotation of the antenna that does not equal 90 degrees.

10. The antenna apparatus according to claim 9,
wherein the angle α is 45 degrees.

11. A fill level measurement device comprising an antenna apparatus according to claim 1, wherein the fill level measurement device comprises digital evaluation circuitry configured to determine a topology of a medium in a container.

12. The fill level measurement device according to claim 11, the device being further configured to determine a viscosity of a moving liquid.

13. The fill level measurement device according to claim 11, the device being further configured to determine a mass flow rate of a bulk material on a conveyor belt.

14. A method for determining a topology of a surface of a filling material or a surface of a bulk material, comprising:
rotating an antenna about an axis of rotation, the antenna comprising an array of a plurality of radiator elements;
emitting, by the antenna, a measurement signal towards and/or receiving a reflected measurement signal from a filling material surface;
focussing, by an elongate focussing arrangement, the emitted measurement signal and/or the reflected measurement signal;
receiving the reflected measurement signal reflected by the surface of the filling material or the surface of the bulk material; and
calculating the topology of the surface of the filling material or the surface of the bulk material from the received measurement signal.

15. The antenna apparatus according to claim 1,
wherein the elongate focussing arrangement comprises a dielectric cylindrical lens having a longitudinal axis that is parallel to a longitudinal direction of the antenna,
wherein the array is a two-dimensional array, having a plurality of columns extending in a longitudinal direction of the antenna, and a plurality of rows extending in a transverse direction of the antenna, and
wherein radiator elements of the plurality of radiator elements in each column of the plurality of columns are conductively interconnected.

16. The antenna apparatus according to claim 1,
wherein the elongate focussing arrangement comprises a parabolic trough as a main reflector, and a counter reflector arranged at a spacing from the parabolic trough,
wherein the array is further configured to emit the measurement signal towards the counter reflector and is arranged either on or near to a surface of the parabolic trough,
wherein the array is a two-dimensional array, having a plurality of columns extending in a longitudinal direction of the antenna, and a plurality of rows extending in a transverse direction of the antenna, and
wherein radiator elements of the plurality of radiator elements in each column of the plurality of columns are conductively interconnected.

* * * * *